No. 622,596. Patented Apr. 4, 1899.
R. BOSTOCK & F. A. CHEETHAM.
APPARATUS FOR HOLDING AND CONNECTING GUARD WIRES OF ELECTRIC CABLES OR OTHER WIRES.
(Application filed Nov. 29, 1898.)
(No Model.)
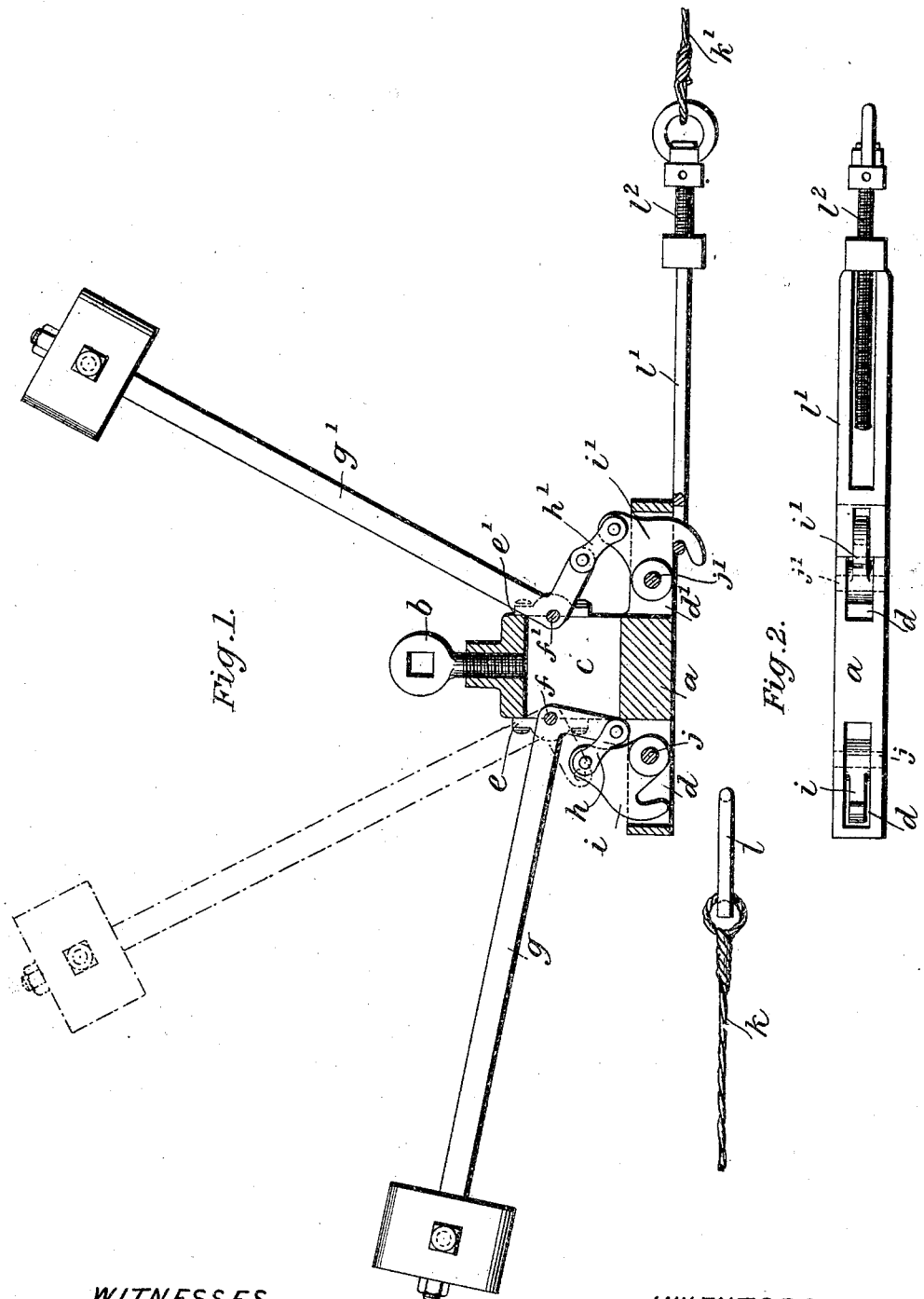
WITNESSES.
J. B. Howard
Gervase Appleyard.
INVENTORS.
Frank Arthur Cheetham.
Ralph Bostock.

UNITED STATES PATENT OFFICE.

RALPH BOSTOCK AND FRANK ARTHUR CHEETHAM, OF BRIGHOUSE, ENGLAND.

APPARATUS FOR HOLDING AND CONNECTING GUARD-WIRES OF ELECTRIC CABLES OR OTHER WIRES.

SPECIFICATION forming part of Letters Patent No. 622,596, dated April 4, 1899.

Application filed November 29, 1898. Serial No. 697,795. (No model.)

*To all whom it may concern:*

Be it known that we, RALPH BOSTOCK and FRANK ARTHUR CHEETHAM, subjects of Her Majesty the Queen of Great Britain, residing at Brighouse, in the county of York, England, have invented a certain new and useful Improvement in Apparatus for Holding and Connecting Guard-Wires of Electric Cables or other Wires, of which the following is a specification.

Our invention relates to an improvement in apparatus for holding and connecting guard-wires of electric cables and other wires, electric or otherwise, the object being in the case of the guard-wires of overhead electric cables as used for tramways and railways to divide such wires into sections in such a manner that should one of the wires be broken at any point between two of the supporting poles or brackets that wire will be at once liberated and dropped at each pole or bracket—that is, at the next points or each side of the breakage.

One form of our apparatus is illustrated in the accompanying drawings, in which—

Figure 1 is a sectional elevation of same, showing a wire attached on one side and released on the other; and Fig. 2 is a plan looking upward.

The apparatus consists of a block $a$, having a hook or ring $b$ or other means for attaching same to the usual supporting pole or bracket. The block is slotted or open at $c$ and at $d\ d'$, respectively, and on either side of the opening $c$ at one end it carries two bearings $e\ e$, (of which only one is shown,) there being similar bearings $e'\ e'$ (of which only one is shown) on the other end. Between these bearings are held pins $f f'$, on which are pivoted cranked levers $g\ g'$, (the short ends of which can partly enter the slot $c$,) carrying adjustable weights, while the short ends have pivotally connected to them links $h\ h'$, pivotally connected in turn to hooks $i\ i'$, hung on pins $j\ j'$ in the slots $d\ d'$, respectively. The hooks $i\ i'$ carry the wires $k\ k'$ preferably through the medium of a slotted plate, as $l'$, such plate having an adjusting or tightening screw $l^2$, carrying a ring or hook, to which the wire is attached, or in place of this plate $l'$ a slotted plate or a ring, such as $l$, may be used for engaging with the hooks, the object of using a stiff plate or the like being to insure the wire being liberated, a loop of wire engaging with the hooks being liable to jam. In use a wire, such as $k'$, is stretched between the hook $i'$ and the corresponding hook on a similar apparatus at the next pole or bracket, and the tension on the wire on hook $i'$ serves to keep the weighted lever $g'$ in its raised position, as shown. As soon as a breakage of such wire $k$ occurs the weighted lever falls, and the hook $i$, being drawn into the slot $d'$, disengages itself from the plate of the wire, and thus drops that end of same, a similar operation taking place with the apparatus holding the other end, so that both ends are released and that section falls away from the posts or brackets. The parts then assume the position shown on the left-hand side of the drawings; but it will be understood that the falling of one section makes no interference with the next section, which is held at one end by the other hook of the apparatus.

What we claim is—

1. In apparatus for holding and connecting wires and in combination, a block, hooks pivoted at opposite points of same, weighted cranked levers pivoted in the block, and connections between same and the hooks so that wires in tension attached to said hooks will be held until the tension is relaxed when the weighted lever will release the hook from same substantially as described.

2. In apparatus for holding and connecting wires and in combination, a block, a slot in same, a hook pivotally hung in such slot, and a weighted cranked lever pivoted in the block and pivotally connected to the hook so that a wire in tension attached to said hook will be held until the tension is relaxed when the weighted lever will draw the hook into the slot and release the wire substantially as described.

3. In combination the block $a$, slots $d\ d'$ hooks $i$ pivotally hung in same, weighted levers $g\ g'$ pivoted to the block and links $h\ h'$ connecting the levers and the hooks substantially as and for the purpose specified.

In testimony whereof we have hereunto set our hands in the presence of two subscribing witnesses.

RALPH BOSTOCK.
FRANK ARTHUR CHEETHAM.

Witnesses:
I. B. HOWARD,
GERVASE APPLEYARD.